United States Patent [19]

Parvulescu et al.

[11] Patent Number: 6,002,719

[45] Date of Patent: Dec. 14, 1999

[54] TWO WAY MESSAGING SYSTEM WITH NON-REAL TIME VOICE COMPRESSION AND DECOMPRESSION

[75] Inventors: Adrian Parvulescu, Fish's Eddy, N.Y.; Andrew Todd Zidel, Hawthorne, N.J.

[73] Assignees: Sony Corporation, Tokyo, Japan; Sony Electronics Inc., Park Ridge, N.J.

[21] Appl. No.: 08/577,797

[22] Filed: Dec. 22, 1995

[51] Int. Cl.$^6$ ................................................. H04B 1/22
[52] U.S. Cl. ........................... 375/240; 455/31.3; 455/5.1
[58] Field of Search ..................................... 375/240, 241, 375/242, 295, 316, 324; 455/517, 39, 72–78, 515, 412, 403, 31.3–5.1, 413–426, 458; 395/2; 370/435, 521, 477

[56] References Cited

U.S. PATENT DOCUMENTS

| | | | |
|---|---|---|---|
| 4,095,288 | 6/1978 | Gerson et al. ............................ | 375/240 |
| 5,029,236 | 7/1991 | Yasuda et al. . | |
| 5,199,031 | 3/1993 | Dahlin ..................................... | 370/212 |
| 5,247,700 | 9/1993 | Wohl et al. . | |
| 5,278,866 | 1/1994 | Nonami .................................... | 375/227 |
| 5,278,990 | 1/1994 | VanDenHeuvel et al. . | |
| 5,375,189 | 12/1994 | Tsutsui . | |
| 5,412,719 | 5/1995 | Hamamoto et al. . | |
| 5,592,556 | 1/1997 | Schwed ..................................... | 380/49 |
| 5,592,586 | 1/1997 | Maitra et al. .......................... | 395/2.29 |
| 5,630,205 | 5/1997 | Ekelund .................................. | 455/517 |
| 5,632,001 | 5/1997 | Terauchi ................................. | 704/201 |

OTHER PUBLICATIONS

"Value–loaded pagers, low prices create buyer's market", *Telecom Sources*, Oct. 1995, pp. 110–158. USA.

*Primary Examiner*—Wellington Chin
*Assistant Examiner*—Congvan Tran
*Attorney, Agent, or Firm*—Christopher M. Tobin; Jerry A. Miller

[57] ABSTRACT

A two way messaging terminal includes a transmitter and a receiver. A voice message is encoded using a CODEC after which the resulting data is compressed in non-real time prior to transmission. On receipt the compressed message is first decompressed in non-real time prior to decoding and playing back.

25 Claims, 2 Drawing Sheets

6,002,719

TWO WAY MESSAGING SYSTEM WITH NON-REAL TIME VOICE COMPRESSION AND DECOMPRESSION

BACKGROUND

1. Field of the Invention

This invention relates generally to the field of two way messaging systems. More particularly, this invention relates to a non-real time two way messaging system which utilizes data compression to minimize transmission time and thus conserve battery life and optimize bandwidth utilization.

2. Background of the Invention

Two way radio systems have been in use for a number of years to facilitate two way communication between parties. However, use of these systems has largely been limited to specialized business applications (e.g. security), police, government and military use due to the cost and bulk of the devices. Consumers have found pagers and cellular telephone devices to provide a more convenient mechanism for everyday communication needs both for business and private use. Unfortunately, the cost of use of cellular telephones remains high for some users and paging devices generally permit only one way communication, thus requiring access to a telephone to enable the user to provide a response.

Recently, personal two way messaging systems (such as Motorola's Tango and Tenor pagers) which provide limited two way messaging capability have become available. Like pagers, such two way messaging systems are designed to be personal devices which are compact and easy to carry. Unfortunately, the convenience of small size and weight limits the size of the battery used to power such devices. As a result, substantial efforts have been devoted to the problem of optimizing battery drain in such devices in order to maximize the battery life for these devices. Moreover, the availability of bandwidth is problematic and thus use of the available bandwidth should be optimized.

SUMMARY OF THE INVENTION

It is an object of the present invention to provide a non-real time two way messaging system which utilizes data compression to minimize transmission times.

It is an advantage that the present invention reduces battery drain during transmission by optimizing compression of transmitted messages.

These and other objects, advantages and features of the invention will become apparent to those skilled in the art upon consideration of the following description of the invention.

In one embodiment of the present invention a two way messaging terminal includes a transmitter and a receiver. A voice message is encoded using a CODEC after which the resulting data is compressed in non-real time prior to transmission. On receipt the compressed message is first decompressed in non-real time prior to decoding and playing back as a voice message.

In a transmitter for a speech messaging terminal, according to one aspect of the invention, a microphone receives a speech message and converts the speech message to an analog electrical signal. A CODEC encodes the analog electrical signal into a coded digital signal. A memory stores the coded digital signal. A data compression processor further compresses the coded digital signal in non-real time to produce a highly compressed data message; and a radio frequency transmitter transmits the highly compressed data message.

In a receiver for a speech messaging terminal, according to one aspect of the invention, a radio frequency receiver receives radio signals. A decompression processor decompresses the radio signal in non-real time to produce a decompressed message. A CODEC decodes the compressed message to produce an analog signal. The analog signal is then reproduced as a voice message.

A method carried out in a two way messaging system for operation of said two way messaging system, in one embodiment of the invention includes the steps of: receiving a radio signal including a compressed voice message; decompressing the compressed voice message in non-real time to produce a decompressed message; real time decoding the decompressed message to produce an analog voice signal; and playing the analog voice signal as an audible message.

A method carried out in a two way messaging system for operation of said two way messaging system, according to another embodiment of the invention, includes the steps of: receiving a radio signal including a compressed voice message; decompressing the compressed voice message in non-real time to produce a decompressed message; real time decoding the decompressed message to produce an analog voice signal; and playing the analog voice signal as an audible message.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
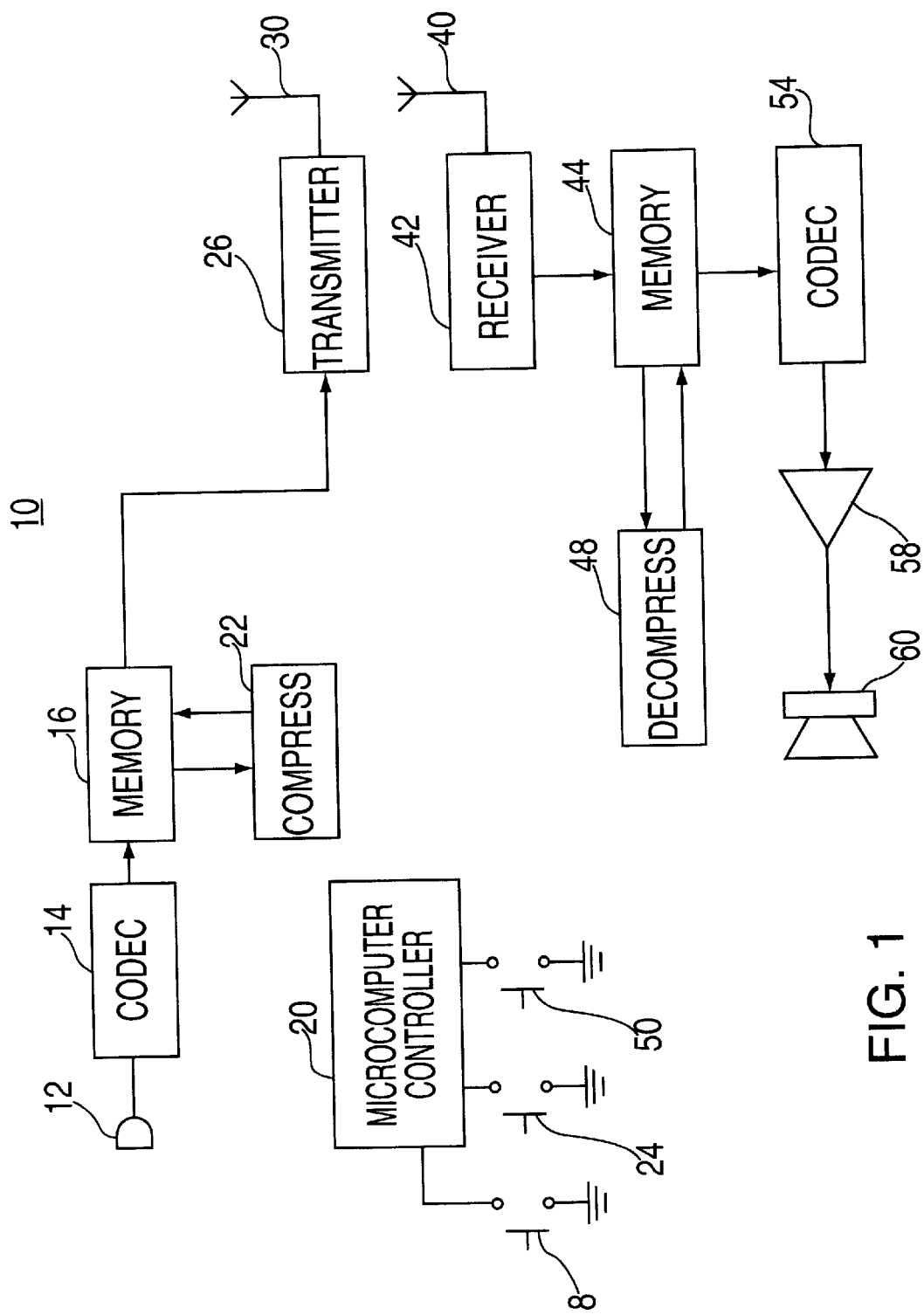
FIG. 1 is a block diagram of an embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described.

For purposes of this invention, it is important to understand the concept of real time communications versus non-real time communications. The term real time communications is used herein to mean communications analogous to a conventional spoken conversation. In such communication, messages are not stored or delayed for significant or noticeable periods of time prior to receipt by the message's recipient. Thus, messages are processed by electronic circuitry for only small fractions of a second, in general. By contrast, non-real time messaging permits substantial delays of several seconds, minutes or perhaps even hours prior to receipt by the recipient. As such, non-real time messaging is not well suited for carrying out "conversations." It is more suitable for transmitting short messages, asking short questions and acknowledging receipt of messages.

Turning now to FIG. 1, a block diagram of a two way messaging terminal 10 according to the present invention is shown. In the preferred embodiment, terminal 10 is a personal messaging device which resembles a radio pager in size and weight, except that it can receive as well as transmit voice messages. As with pagers, communication is generally carried out through a base station repeater, as is known in the art. The messaging terminal 10 includes a record switch 8 and a microphone 12 for receiving spoken messages from a user for transmission. When the user wishes to record a message, he actuates "record" switch 8. The output of microphone 12 may be amplified if necessary and is then provided to a transmitter speech CODEC (coder/decoder) 14 where analog to digital conversion (A/D) of the analog speech signal and real time coding of the speech message is carried out. The coding process may be any suitable coding process which preferably results in substantial compression of the spoken message by virtue of using any of a number of known speech coding algorithms. Examples of speech compression algorithms which can be include silence deletion, linear predictive coding (LPC), multi-band excitation (MBE), single band excitation (SBE), sub-band coding, harmonic coding, discrete cosine transform, modified discrete cosine transform, Fast Fourier Transform (FFT), code excited linear prediction, vector sum linear prediction, pitch synchronous inovation, regular pulse excitation-long term prediction, as well as other known algorithms or combinations of such algorithms.

As a result of such coding methods, a substantial degree of compression can be achieved. Speech messages can be coded into a bitstream in the range of 3.6 to 2.4 KBPS can be produced. Compared with a 32 KBPS PCM representation, this equates to a compression ratio of approximately 8.8:1 to 13.3:1. Several commercially available technologies can be used to achieve this level of compression (e.g. Advanced Multi-Band Excitation AMBE implemented in the VCFD-100 circuit which operates at 3.6 KBPS from Digital Voice Systems, Inc., Burlington, Mass., or Hidden Markov Models (HMM) and artificial neural networks and CELP protocol available from Lemout and Hauspie Speech Products USA, Inc., Woburn, Mass.). Speech compression techniques and devices with even higher compression ratios are anticipated as this technology progresses. Once encoded, the encoded message is stored in a memory 16 under control of a microprocessor controller 20 (which oversees and controls operation and all functions of the messaging terminal). CODEC 14 may be implemented in dedicated hardware or as a process carried out in a digital signal processor (DSP) circuit.

Once the user's message is stored in memory 16, it is further compressed by a data compression processor 22 which may be implemented using a hardware data compressor or a programmed digital signal processing integrated circuit. Since the messaging terminal 10 is not intended for real time messaging, the compression processor 22 may take a comparatively long period of time to compress the speech message and then store it back into memory 16 as a compressed message. Thus, the compression processor 22 may optimize compression of the original speech message to produce a message of optimum compactness. Moreover, since real time (or near real time) processing is not required, the compression processor may operate a substantially lower clock rate than a real time compression processor and thus reduce battery drain and conserve battery life. Those skilled in the art will appreciate that any number of known or proprietary data or file compression (and decompression) processes (e.g. Limpel-Ziv, PKZIP, Huffman, run length coding, etc.) can be used to effect the non-real time compression (and decompression) of the present invention. It is desirable that whatever algorithm or combination of algorithms are used, that it result in maximal compactness of the data representing the message. In tests, compression on the order of about 4:1 was readily achieved using PKZIP to compress the compressed speech file. Thus, overall compression on the order of about 32:1 to 55:1 or greater can be achieved in many cases over 32 KBPS PCM encoding.

After the user has completed storing his message, he may activate a transmit switch 24. Once the compression processor 22 has completed generating the compressed message, the controller 20 sends the compressed message from memory 16 to a transmitter 26 (a radio modem transmitter) for transmission over a transmitter antenna 30. Since the size of the transmitted message has been minimized by the compression processor 22, the transmission time needed to transmit the message is minimal and thus the amount of battery capacity required to complete the transmission is also minimal. In addition to minimizing battery drain, bandwidth usage is optimized by the non-real time compression process.

When a message is to be received by terminal 10, an RF signal is received by a receive antenna 40 (which may be the same as antenna 30, or may be a different antenna) and supplied to a radio receiver 42 (a radio modem receiver). Receiver 42 receives the RF signal from antenna 40 and converts it to a demodulated data stream which is stored in memory 44, again under control of controller 20. When a message is thus received, a non-real time decompression processor 48 (which may be the same digital signal processor used to implement compression processor 22, decompresses the message stored in memory 44 and returns the decompressed message to memory 44. As with the compression process, the decompression process need not be carried out in real time and the processor need not operate at the speeds required for real time processing. Thus, non-real time decompression results in further improvements in battery life.

Once the message is ready to be played, the user is alerted by any suitable alert that a message has been received. The user can then actuate a "play" switch which sends the decompressed message from memory 44 to a receive CODEC 54 which performs digital to analog conversion (D/A) and decoding of the data in real time to produce speech signals. The output of CODEC 54 is amplified by an amplifier 58 which drives a transducer 60 to play the audio message for the user. CODEC 54 may be implemented by a programmed digital signal processor (or other means as described in connection with CODEC 14) and may be carried out by the same physical circuit as CODEC 14. Similarly, compression and decompression processors 22 and 48 may be implemented using the same physical circuit and may be a further process carried out on the same digital signal processor or by the microcomputer controller 20 or other microcomputer in order to further reduce power, size and cost.

Thus, the present system provides for a minimal bandwidth consumption and enhanced battery life by minimizing transmission time and using data compression and decompression operations which are carried out at reduced computing speeds.

Figure 2:
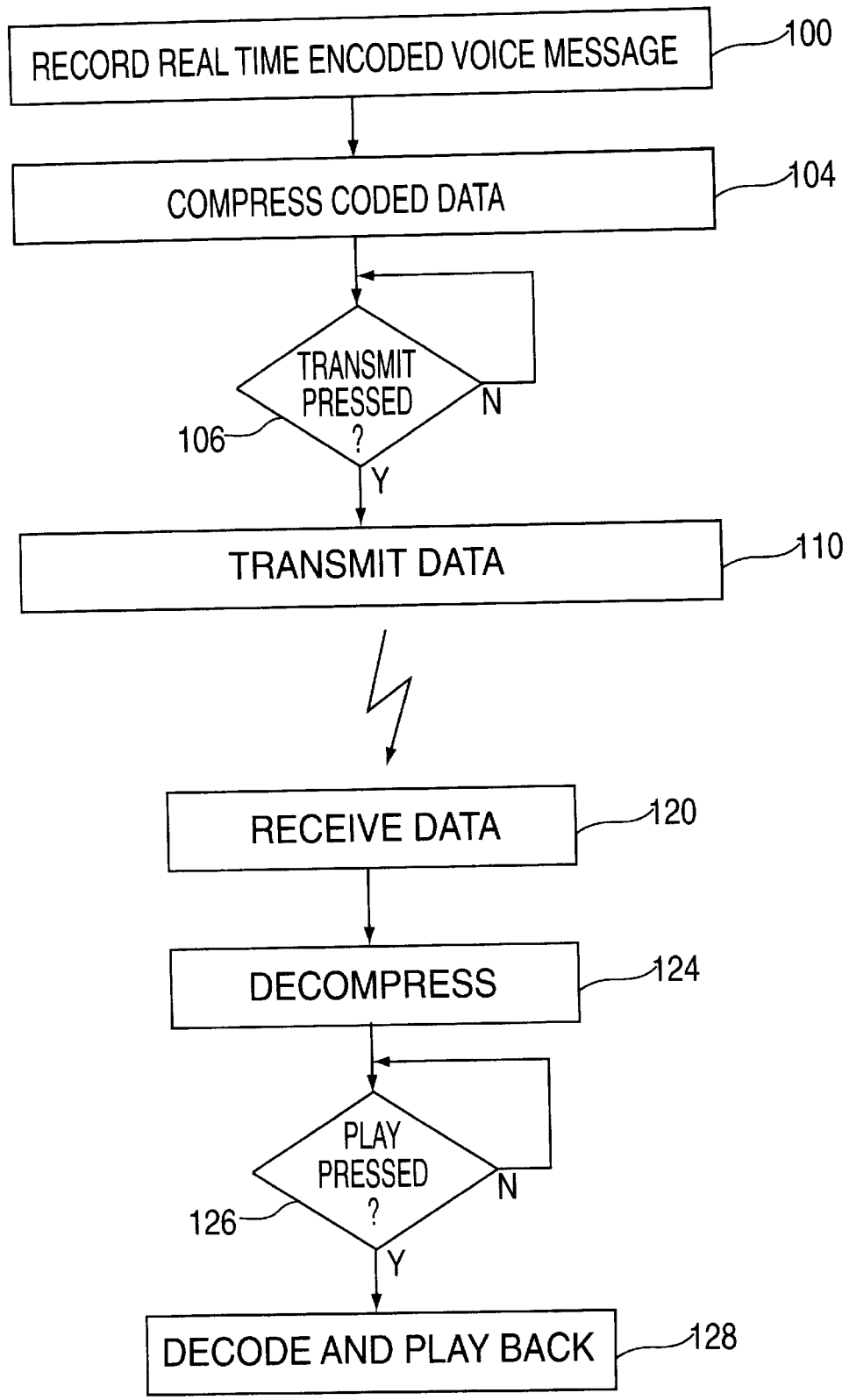
FIG. 2 is a flow chart illustrating operation of the present invention.

Turning now to FIG. 2, a flow chart illustrates the process of the present invention illustrates the transmit and receive processes carried out as described above. In the transmission process, the speech message is recorded and encoded in real time at step 100 using a speech coding and compression process. The resulting data is then compressed by a compression algorithm at step 104 in non-real time to produce a data file of maximal compactness. Once the user actuates the transmit switch at step 106, the data is transmitted by the transmitter.

In the receive process, the compressed data message is received at step 120, and the data are decompressed in non-real time to produce a decompressed data file. When the play switch is actuated at 126, the message is decoded and decompressed using a speech decompression process. It is then played to the user in real time at step 128.

While the present invention has been described in conjunction with a particular embodiment, those skilled in the art will appreciate that many variations are possible. For example, the transmitter and receiver could use infrared technology in specialized circumstances. In other embodiments, the CODECs could be simple A/D and D/A converters.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A speech messaging terminal comprising in combination:
   a microphone for receiving speech message and converting the speech message to an analog electrical signal;
   a CODEC for encoding said analog electrical signal into a coded digital signal in real time using a speech compression process algorithm;
   a memory for storing said coded digital signal;
   a data compression processor for compressing said coded digital signal in non-real time to produce a compressed data message, wherein said data compression processor operates at a lower clock rate than said CODEC; and
   a radio frequency transmitter for transmitting said compressed data message.

2. The speech messaging terminal of claim 1, wherein said radio frequency transmitter transmits said message in response to actuation of a transmit switch.

3. The speech messaging terminal of claim 1, wherein said speech message is stored in said memory in response to actuation of a record switch.

4. The speech messaging terminal of claim 1, wherein said CODEC includes a programing digital signal processor.

5. The speech messaging terminal of claim 1, wherein said data compression processor includes a programmed processor.

6. A speech messaging terminal, comprising in combination:
   a radio frequency receiver for receiving radio signals and for providing a compressed data message;
   a data decompression processor for decompressing said compressed data message in non-real time to produce a decompressed message;
   a CODEC for decoding said decompressed message in real time using a speech decompression process algorithm to produce an analog signal, wherein said data decompression processor operates at a lower clock rate than said CODEC; and
   means for converting said analog signal to a voice message.

7. The speech messaging terminal of claim 6, wherein said decompressed message is decoded by said CODEC in real time in response to actuation of a switch.

8. The speech messaging terminal of claim 6, wherein said CODEC includes a programmed digital signal processor.

9. The speech messaging terminal of claim 6, wherein said decompression processor includes a programmed processor.

10. A two way speech messaging system comprising in combination:
    a transmitter including:
      a microphone for receiving speech message and converting the speech message to an analog electrical signal;
      a transmit CODEC for encoding said analog electrical signal into a coded digital signal in real time using a speech compression process algorithm;
      a memory for storing said coded digital signal;
      a data compression processor for compressing said coded digital signal in non-real time to produce a compressed data message, wherein said data compression processor operates at a lower clock rate than said transmit CODEC; and
      a radio frequency transmitter for transmitting said compressed data message; and
    a receiver including:
      a radio frequency receiver for receiving radio signals and for providing a compressed data message;
      a data decompression processor for decompressing said compressed data message in non-real time to produce a decompressed message;
      a receive CODEC for decoding said decompressed message to produce an analog signal in real time using a speech decompression process algorithm, wherein said data decompression processor operates at a lower clock rate than said receive CODEC; and
      means for converting said analog signal to a voice message.

11. The speech messaging terminal of claim 10, wherein said radio frequency transmitter transmits said message in response to actuation of a transmit switch.

12. The speech messaging terminal of claim 10, wherein said speech message is encoded by said transmit CODEC and stored in said memory in response to actuation of a record switch.

13. The speech messaging terminal of claim 10, wherein said transmit CODEC includes a programmed digital signal processor.

14. The speech messaging terminal of claim 10, wherein said compression processor includes a programmed processor.

15. The speech messaging terminal of claim 10, wherein said decompressed message is decoded by said receive CODEC in response to actuation of a switch.

16. The speech messaging terminal of claim 10, wherein said receive CODEC includes a programmed digital signal processor.

17. The speech messaging terminal of claim 10, wherein said decompression processor includes a programmed processor.

18. A method carried out in a two way messaging system for operation of said two way voice messaging system, comprising the steps of:
    receiving an audible message at a microphone;
    real time encoding said audible message as a digital message using a speech compression process algorithm and storing said digital message in a memory;
    non-real time compressing said message to produce a compressed message, wherein said non-real time compressing step operates at a lower clock rate than said real time encoding step; and, transmitting said compressed message.

19. The method of claim 18, wherein said real time encoding is carried out in a CODEC.

20. The method of claim 18, wherein said non-real time compressing is carried out in a programmed processor.

21. A method carried out in a two way messaging system for operation of said two way messaging system, comprising the steps of:

receiving a radio signal including a compressed voice message;

decompressing said compressed voice message in non-real time to produce a decompressed message;

real time decoding said decompressed message using a speech decompression process algorithm to produce an analog voice signal; and, playing said analog voice signal as an audible message, wherein said non-real time decompressing step operates at a lower clock rate than said real time decoding step.

22. The method of claim 21, wherein said decompressing is carried out by a programmed processor.

23. The method of claim 21, wherein said real time decoding is carried out by a programmed digital signal processor.

24. A two way speech messaging system comprising in combination:

a transmitter including:

a microphone for receiving a speech message and converting the speech message to an analog electrical signal;

a record switch;

a transmit CODEC, comprising a programmed digital signal processor; for encoding said analog electrical signal into a coded digital signal in real time using a speech compression process and storing said coded digital in a memory in response to actuation of said record switch;

a transmit switch;

a programmed data compression processor for compressing said coded digital signal in non-real time to produce a compressed data message, wherein said programmed data compression processor operates at a lower clock rate than said transmit CODEC; and a radio frequency transmitter for transmitting said compressed data message in response to actuation of said transmit switch;

a receiver including:

a radio frequency receiver for receiving radio signals and for providing a compressed data message;

a decompression processor for decompressing said compressed data message in non-real time to produce a decompressed message;

means for storing said decompressed message;

a play switch;

a receive CODEC, responsive to said play switch and also comprising said programmed digital signal processor, for removing said decompressed message from said storing means and decoding said compressed message in real time using a speech decompression process to produce an analog signal, wherein said decompression processor operates at a lower clock rate than said receive CODEC;

an audio amplifier for amplifying said analog signal; and, a transducer for converting said analog signal to a voice message.

25. A method carried out in a two way messaging system for operation of said two way messaging system, comprising the steps of:

receiving a message by:

receiving a radio signal including a compressed voice message;

decompressing said compressed voice message in non-real time to produce a decompressed message;

real time decoding said decompressed message using a speech decompression process algorithm to produce an analog voice signal, wherein said non-real time decompressing step operates at a lower clock rate than said real time decoding; and playing said analog voice signal as an audible message; and, transmitting a message by:

receiving an audible message at a microphone;

real time encoding said audible message as a digital message using a speech compression process algorithm and storing said digital message in a memory;

non-real time compressing said message to produce a compressed message; and, transmitting said compressed message.

* * * * *